United States Patent
Zhu et al.

(10) Patent No.: US 11,582,825 B2
(45) Date of Patent: Feb. 14, 2023

(54) METHODS AND APPARATUSES FOR NETWORK TRIGGERED SERVICE RESTORATION

(71) Applicant: Telefonaktiebolaget LM Ericsson (publ), Stockholm (SE)

(72) Inventors: Jinyin Zhu, Shanghai (CN); Xiaoming Li, Shanghai (CN); Zhansheng Wei, Shanghai (CN)

(73) Assignee: Telefonaktiebolagget LM Ericsson (Publ), Stockholm (SE)

(*) Notice: Subject to any disclaimer, the term of this patent is extended or adjusted under 35 U.S.C. 154(b) by 152 days.

(21) Appl. No.: 17/264,936

(22) PCT Filed: Sep. 7, 2018

(86) PCT No.: PCT/CN2018/104670
§ 371 (c)(1),
(2) Date: Feb. 1, 2021

(87) PCT Pub. No.: WO2020/047855
PCT Pub. Date: Mar. 12, 2020

(65) Prior Publication Data
US 2021/0321479 A1    Oct. 14, 2021

(51) Int. Cl.
| | | |
|---|---|---|
| H04W 68/00 | (2009.01) |
| H04W 76/19 | (2018.01) |
| H04W 76/28 | (2018.01) |
| H04W 8/24 | (2009.01) |
| H04W 48/16 | (2009.01) |
| H04W 52/02 | (2009.01) |

(52) U.S. Cl.
CPC ............. *H04W 76/19* (2018.02); *H04W 8/24* (2013.01); *H04W 48/16* (2013.01); *H04W 52/0235* (2013.01); *H04W 68/005* (2013.01); *H04W 76/28* (2018.02)

(58) Field of Classification Search
None
See application file for complete search history.

(56) References Cited

U.S. PATENT DOCUMENTS

2018/0227749 A1    8/2018  Yang

FOREIGN PATENT DOCUMENTS

| WO | 2017029000 A1 | 2/2017 |
| WO | 2017079926 A1 | 5/2017 |

(Continued)

OTHER PUBLICATIONS

International Search Report and Written Opinion of the International Searching Authority for PCT International Application No. PCT/CN2018/104670 dated May 31, 2019.

(Continued)

*Primary Examiner* — Gary Lafontant
(74) *Attorney, Agent, or Firm* — Christopher & Weisberg, P.A.

(57) ABSTRACT

Methods and apparatuses are disclosed for network triggered service restoration (NTSR). According to an embodiment, a serving gateway (SGW) obtains, from a mobility management entity (MME), information capable of indicating whether to apply NTSR for a terminal device. In response to detecting a failure of the MME, the SGW determines whether to apply NTSR for the terminal device based on the obtained information.

18 Claims, 8 Drawing Sheets

(56) References Cited

FOREIGN PATENT DOCUMENTS

WO        2018053691 A1    3/2018
WO   WO-2018053691 A1 *  3/2018

OTHER PUBLICATIONS

Ericsson, "eDRX impact on GTPv2 for network originated control plane procedure," C4-151145, 3GPP TSG CT4 Meeting #70, Vancouver, Canda; Aug. 17-21, 2015, 43 pages.
EPO Communication and Supplementary European Search Report dated Mar. 17, 2022 for Patent Application No. 18932545.9, consisting of 14-pages.

* cited by examiner

METHODS AND APPARATUSES FOR NETWORK TRIGGERED SERVICE RESTORATION

CROSS REFERENCE TO RELATED APPLICATION

This application is a 35 U.S.C. § 371 national stage application of PCT International Application No. PCT/CN2018/104670 filed on Sep. 7, 2018, the disclosure and content of which is incorporated by reference herein in its entirety.

TECHNICAL FIELD

Embodiments of the disclosure generally relate to wireless communication, and, more particularly, to methods and apparatuses for network triggered service restoration.

BACKGROUND

This section introduces aspects that may facilitate better understanding of the present disclosure. Accordingly, the statements of this section are to be read in this light and are not to be understood as admissions about what is in the prior art or what is not in the prior art.

Network triggered service restoration (NTSR) is a procedure triggered by serving gateway (SGW) when mobility management entity (MME) has restarted or failed. For example, the 3rd generation partnership project (3GPP) technical specification (TS) 23.007 v15.0.0 has defined the NTSR procedure as below: SGW triggers the restoration procedure by sending downlink data notification (DDN) to MME with international mobile subscriber identification number (IMSI), when downlink data or signaling is received for a user equipment (UE) while SGW has detected the failure of the MME. For UEs using power saving feature, it is also mentioned that SGW may trigger the restoration procedure if there is buffered data. 3GPP TS 23.007 v15.0.0 has also defined that SGW decides which S5/S8 bearer contexts are eligible for network initiated service restoration based on operator's policy, e.g. based on quality of service (QoS) class identifier (QCI) and/or allocation retention priority (ARP) and/or access point name (APN).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for NTSR.

According to one aspect of the disclosure, there is provided a method implemented at an SGW. The method may comprise obtaining, from an MME, information capable of indicating whether to apply NTSR for a terminal device. The method may further comprise, in response to detecting a failure of the MME, determining whether to apply NTSR for the terminal device based on the obtained information.

According to the above aspect, flexible control of whether to apply NTSR can be achieved on a per terminal device basis.

In an embodiment of the disclosure, obtaining the information from the MME may comprise receiving, from the MME, a first indication that indicates disablement of NTSR for the terminal device. Determining whether to apply NTSR for the terminal device may comprise determining not to apply NTSR for the terminal device based on the first indication.

In an embodiment of the disclosure, the first indication may be received in a Create Session Request message.

In an embodiment of the disclosure, obtaining the information from the MME may comprise receiving, from the MME, power saving related information that is related to power saving functionality of the terminal device. Obtaining the information from the MME may further comprise receiving, from the MME, a second indication that the terminal device is in idle state. Determining whether to apply NTSR for the terminal device may comprise determining whether to apply NTSR for the terminal device based on the power saving related information and the second indication.

In an embodiment of the disclosure, the method may further comprise determining a maximum time period for keeping a session of the terminal device before restoration of the session, based on the power saving related information.

In an embodiment of the disclosure, determining whether to apply NTSR for the terminal device may comprise determining whether the terminal device is in sleeping state based on the second indication and the power saving related information. Determining whether to apply NTSR for the terminal device may further comprise, if the terminal device is in sleeping state, determining not to apply NTSR for the terminal device.

In an embodiment of the disclosure, the method may further comprise, when it is determined to apply NTSR for the terminal device, sending the power saving related information to the MME that has been restarted or an alternative MME.

In an embodiment of the disclosure, the power saving related information may comprise at least one of power saving mode (PSM) information and extended discontinuous reception (eDRX) information. The power saving related information may be received in a Create Session Request message. The second indication may be received in a Release Access Bearer Request message or a Modify Bearer Request message.

In an embodiment of the disclosure, the power saving related information may be sent to the restarted MME or the alternative MME in a DDN message. The power saving related information sent to the restarted MME or the alternative MME may comprise eDRX information.

In an embodiment of the disclosure, the PSM information may comprise active time, and periodic tracking area update (pTAU) timer. The eDRX information may comprise global unique temporary identity (GUTI) of the terminal device, paging time window (PTW), and eDRX cycle.

According to another aspect of the disclosure, there is provided a method implemented at an MME. The method may comprise determining whether to disable NTSR for a terminal device. The method may further comprise, when it is determined to disable NTSR for the terminal device, sending, to an SGW, a first indication that indicates disablement of NTSR for the terminal device. The method may further comprise, when it is determined not to disable NTSR for the terminal device, sending, to the SGW, information that can be used to determine whether to apply NTSR for the terminal device.

In an embodiment of the disclosure, the method may further comprise obtaining the first indication from a home subscriber server (HSS). Determining whether to disable NTSR for the terminal device may comprise determining to disable NTSR for the terminal device based on the obtained first indication.

In an embodiment of the disclosure, determining whether to disable NTSR for the terminal device may comprise determining whether to disable NTSR for the terminal device based at least on power saving related information that is related to power saving functionality of the terminal device.

In an embodiment of the disclosure, determining whether to disable NTSR for the terminal device based at least on the power saving related information may comprise, when the terminal device is of high mobility and the power saving related information indicates that PSM is enabled for the terminal device, determining to disable NTSR for the terminal device.

In an embodiment of the disclosure, sending the information to the SGW may comprise sending, to the SGW, power saving related information that is related to power saving functionality of the terminal device. Sending the information to the SGW may further comprise sending, to the SGW, a second indication that the terminal device is in idle state.

In an embodiment of the disclosure, the method may further comprise receiving power saving related information of a terminal device. The method may further comprise, when applying NTSR for the terminal device, determining whether the terminal device is reachable based on the received power saving related information.

In an embodiment of the disclosure, the received power saving related information may comprise eDRX information.

According to another aspect of the disclosure, there is provided a method implemented at an HSS. The method may comprise determining whether to disable NTSR for a terminal device. The method may further comprise, when it is determined to disable NTSR for the terminal device, sending, to an MME, an indication that indicates disablement of NTSR for the terminal device.

In an embodiment of the disclosure, the indication may be sent in an Update Location Answer or Insert Subscriber Data Request message.

According to another aspect of the disclosure, there is provided an SGW. The SGW may comprise at least one processor and at least one memory. The at least one memory may contain instructions executable by the at least one processor, whereby the SGW may be operative to obtain, from an MME, information capable of indicating whether to apply NTSR for a terminal device. The SGW may be further operative to, in response to detecting a failure of the MME, determine whether to apply NTSR for the terminal device based on the obtained information.

In an embodiment of the disclosure, the SGW may be operative to perform the method according to the above aspect.

According to another aspect of the disclosure, there is provided an MME. The MME may comprise at least one processor and at least one memory. The at least one memory may contain instructions executable by the at least one processor, whereby the MME may be operative to determine whether to disable NTSR for a terminal device. The MME may be further operative to, when it is determined to disable NTSR for the terminal device, send, to an SGW, a first indication that indicates disablement of NTSR for the terminal device. The MME may be further operative to, when it is determined not to disable NTSR for the terminal device, send, to the SGW, information that can be used to determine whether to apply NTSR for the terminal device.

In an embodiment of the disclosure, the MME may be operative to perform the method according to the above aspect.

According to another aspect of the disclosure, there is provided an HSS. The HSS may comprise at least one processor and at least one memory. The at least one memory may contain instructions executable by the at least one processor, whereby the HSS may be operative to determine whether to disable NTSR for a terminal device. The HSS may be further operative to, when it is determined to disable NTSR for the terminal device, send, to an MME, an indication that indicates disablement of NTSR for the terminal device.

In an embodiment of the disclosure, the HSS may be operative to perform the method according to the above aspect.

According to another aspect of the disclosure, there is provided a computer program product. The computer program product may comprise instructions which when executed by at least one processor, cause the at least one processor to perform the method according to the above aspect.

According to another aspect of the disclosure, there is provided a computer readable storage medium. The computer readable storage medium may comprise instructions which when executed by at least one processor, cause the at least one processor to perform the method according to the above aspect.

According to another aspect of the disclosure, there is provided an SGW. The SGW may comprise an obtaining module for obtaining, from an MME, information capable of indicating whether to apply NTSR for a terminal device. The SGW may further comprise a determination module for, in response to detecting a failure of the MME, determining whether to apply NTSR for the terminal device based on the obtained information.

According to another aspect of the disclosure, there is provided an MME. The MME may comprise a determination module for determining whether to disable NTSR for a terminal device. The MME may further comprise a first sending module for, when it is determined to disable NTSR for the terminal device, sending, to an SGW, a first indication that indicates disablement of NTSR for the terminal device. The MME may further comprise a second sending module for, when it is determined not to disable NTSR for the terminal device, sending, to the SGW, information that can be used to determine whether to apply NTSR for the terminal device.

According to another aspect of the disclosure, there is provided an HSS. The HSS may comprise a determination module for determining whether to disable NTSR for a terminal device. The HSS may further comprise a sending module for, when it is determined to disable NTSR for the terminal device, sending, to an MME, an indication that indicates disablement of NTSR for the terminal device.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In the following description of the present disclosure, the term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

According to the current NTSR procedure as mentioned above, for a network where MME redundancy is not deployed (i.e., the MME does not replicate a UE's context to another MME), there are below problems. Firstly, there may be failure of NTSR and radio resource waste due to meaningless paging. For example, for cognitive Internet of things (CIoT) users using power saving feature, when SGW triggers the service restoration procedure upon receiving downlink data or signaling, the UE may not be reachable but the MME will still try to page the UE.

Secondly, SGW does not know how long UEs' sessions should be kept if they are not restored in time. For example, for UEs using power saving mode (PSM), the periodic tracking area update (pTAU) timer may be quite long and it varies from UE to UE, which makes it inefficient to have a generic period for keeping the session. Thirdly, there may be unnecessary restoration procedure for a UE using PSM. For example, for a UE using PSM and being in sleeping state, there is no necessity for SGW to trigger the restoration procedure since when the UE wakes up, the UE will anyway send signaling (e.g. pTAU or service request) to MME which will trigger the restoration of MME.

Even in a network where MME redundancy is deployed (i.e., the MME replicates a UE's context to another MME), the second and third problems as mentioned above still exist. Another problem is that there is no UE level control of whether NTSR applies or not. For some CIoT users, NTSR might not be necessary at all, meaning that for such CIoT user, it is enough to rely on UE initiated signaling to do the restoration of MME.

The present disclosure proposes improved solutions for NTSR. Hereinafter, the solutions will be described in detail with reference to FIGS. 1-17.

Figure 1:
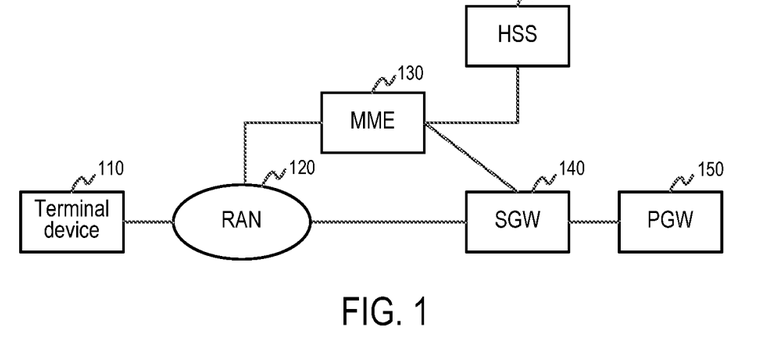
FIG. 1 is a diagram showing an exemplary wireless communication system into which an embodiment of the disclosure is applicable.

FIG. 1 is a diagram showing an exemplary wireless communication system into which an embodiment of the disclosure is applicable. As shown, the wireless communication system comprises a terminal device 110, a radio access network (RAN) 120, a mobility management entity (MME) 130, a serving gateway (SGW) 140, a packet data network (PDN) gateway (PGW) 150 and a home subscriber server (HSS) 160. Note that the number of each entity mentioned above may be more than one.

The terminal device 110 can communicate through a radio access communication link with the RAN 120. The communication may be performed according to any suitable communication protocols. The terminal device may also be referred to as, for example, mobile station, mobile unit, subscriber station, user equipment (UE), access terminal, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 120 may include, for example, a universal mobile telecommunications system (UMTS) terrestrial RAN (UTRAN), a global system for mobile communication (GSM)/enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to terminal devices that are within their respective communication service cells. The E-UTRAN can include radio base station nodes (eNodeBs) that can provide the combined functionality of the RNC nodes and base stations of the UTRAN and the GERAN.

The MME 130 is a core network node in evolved packet system (EPS) and can carry out mobility management of the terminal device 110, bearer management, and the like. The SGW 140 can route and forward signalling and user data packets, while also acting as the mobility anchor for user plane during inter-base station/eNodeB handovers and as the anchor for mobility between long term evolution (LTE) and other 3GPP technologies. The PGW 150 can provide entry and exit points to a packet-based network for the traffic of the terminal device 110 flowing through the SGW 140. The packet-based network may include the Internet and/or other packet network elements. The HSS 160 is a control-plane node in the core network of 3GPP public land mobile network (PLMN) and can manage subscriber information of the terminal device 110.

It should be noted that the MME 130, the SGW 140 and the HSS 160 are merely exemplary examples of the components in the wireless communication system and may be replaced by components with similar functionalities. For example, in 5G core (5GC), the MME may be replaced by an access and mobility management function (AMF) entity, the SGW may be replaced by a session management function (SMF) entity, and the HSS may be replaced by a unified data management (UDM) entity.

Figure 2:
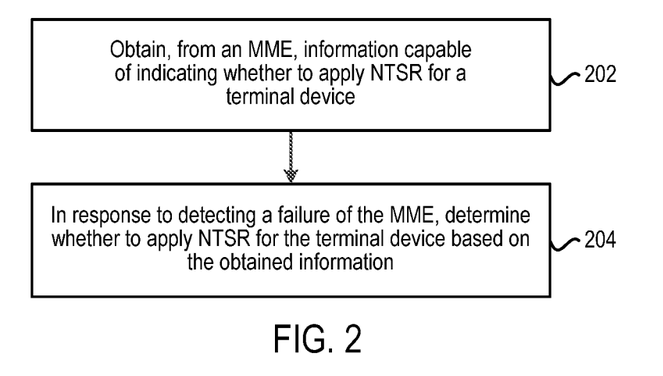
FIG. 2 is a flowchart illustrating a method implemented at an SGW according to an embodiment of the disclosure.

FIG. 2 is a flowchart illustrating a method implemented at an SGW according to an embodiment of the disclosure. At block 202, the SGW obtains, from an MME, information capable of indicating whether to apply NTSR for a terminal device. At block 204, in response to detecting a failure of the MME, the SGW determines whether to apply NTSR for the terminal device based on the obtained information. In this way, flexible control of whether to apply NTSR can be achieved on a per terminal device basis. As the first option, the information can explicitly indicate whether to apply NTSR for a terminal device. In this case, blocks 202-204 may be implemented as blocks 302-304 of FIG. 3, which will be described in detail later. As the second option, the information can implicitly indicate whether to apply NTSR for a terminal device. In this case, blocks 202-204 may be implemented as blocks 402-1, 402-2 and 404 of FIG. 4, which will be described in detail later.

Figure 3:
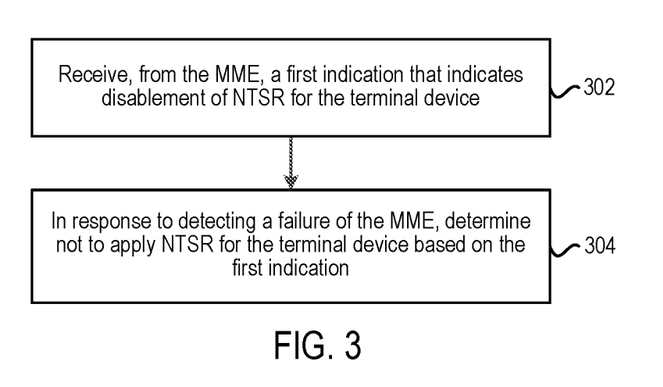
FIG. 3 is a flowchart illustrating a method implemented at an SGW according to another embodiment of the disclosure.

FIG. 3 is a flowchart illustrating a method implemented at an SGW according to another embodiment of the disclosure. As mentioned above, it can be used for explaining the method of FIG. 2. At block 302, the SGW receives, from the MME, a first indication that indicates disablement of NTSR for the terminal device. The first indication may be generated by the MME or an HSS, which will be described in detail later. For example, the first indication may be received in a Create Session Request message. At block 304, the SGW determines not to apply NTSR for the terminal device based on the first indication.

Figure 4:
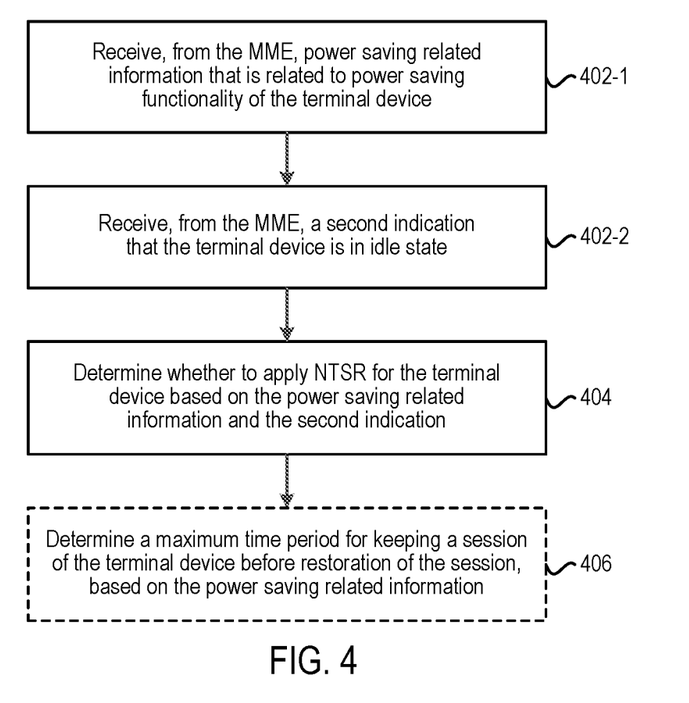
FIG. 4 is a flowchart illustrating a method implemented at an SGW according to another embodiment of the disclosure.

FIG. 4 is a flowchart illustrating a method implemented at an SGW according to another embodiment of the disclosure. As mentioned above, it can also be used for explaining the method of FIG. 2. At block 402-1, the SGW receives, from the MME, power saving related information that is related to power saving functionality of the terminal device. The power saving related information may refer to information related to power saving functionality of the terminal device. For example, the power saving functionality may include power saving mode (PSM), extended discontinuous reception (eDRX), or any other similar functionality. Correspondingly, the power saving related information may include PSM information, eDRX information, or the like. The PSM information may include, but not limited to, active time and periodic tracking area update (pTAU) timer. The eDRX information may include, but not limited to, global unique temporary identity (GUTI) of the terminal device, paging time window (PTW), and eDRX cycle. For example, the power saving related information may be received in a Create Session Request message. At block 402-2, the SGW receives, from the MME, a second indication that the terminal device is in idle state. As an example, the second indication may be received in a Release Access Bearer Request message. As another example, in consideration of the fact that Release Access Bearer Request is not applicable in some circumstances (e.g., UE triggers TAU), the second indication may be received in a Modify Bearer Request message. That is, a new indication (e.g. UE IDLE Indication) may be added into the current Modify Bearer Request message.

Figure 5:
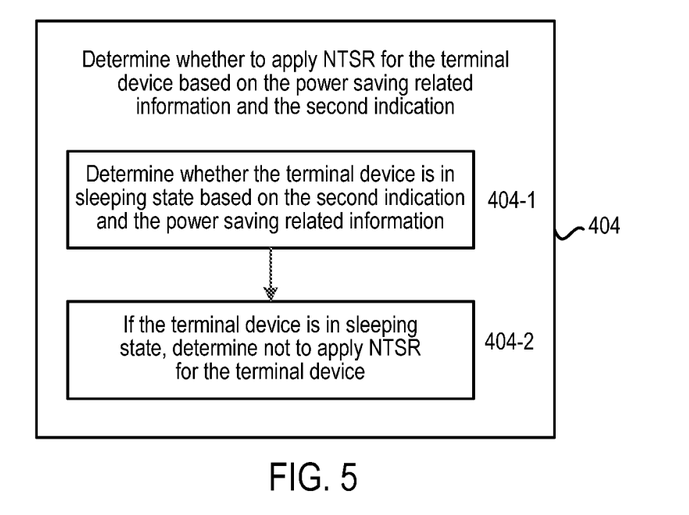
FIG. 5 is a flowchart for explaining the method of FIG. 4.

At block 404, the SGW determines whether to apply NTSR for the terminal device based on the power saving related information and the second indication. As an exemplary example, block 404 may be implemented as blocks 404-1 and 404-2 shown in FIG. 5. At block 404-1, the SGW determines whether the terminal device is in sleeping state based on the second indication and the power saving related information. For example, if the power saving information includes PSM information (which means PSM is enabled for the terminal device) and a time period having the length equaling to the active time (indicated by the PSM information) has elapsed after receiving the second indication, it may be determined that the terminal device is in sleeping state. If the terminal device is in sleeping state, the SGW determines not to apply NTSR for the terminal device at block 404-2. In this way, the NTSR procedure can be avoided for terminal devices using PSM while being in sleeping state. This can make the network more resource efficient for restoration procedure for terminal devices (e.g. CIoT users) using power saving feature when MME failure is detected.

Optionally, at block 406, the SGW determines a maximum time period for keeping a session of the terminal device before restoration of the session, based on the power saving related information. In this way, a generic period for keeping the session can be avoided from being used for all terminal devices. For example, the maximum time period may be determined to be longer than the pTAU timer (indicated by the PSM information) by a predetermined amount. For example, the predetermined amount may enable the maximum time period to be a bit longer than the pTAU timer.

Figure 6:
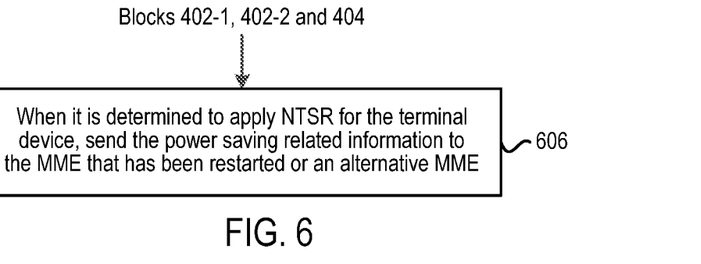
FIG. 6 is a flowchart illustrating a method implemented at an SGW according to another embodiment of the disclosure.

FIG. 6 is a flowchart illustrating a method implemented at an SGW according to another embodiment of the disclosure. As shown, the method comprises blocks 402-1, 402-2, 404 and 606. The first three blocks have been described above and their details are omitted here. At block 606, when it is determined to apply NTSR for the terminal device, the SGW sends the power saving related information to the MME that has been restarted or an alternative MME. The alternative MME refers to an MME which is selected for applying NTSR for the terminal device due to a failure of the MME. The sent power saving related information may include eDRX information, which can help the restarted MME or the alternative MME determine whether the terminal device is reachable. This can avoid the waste of resource (e.g. radio resource) caused by NTSR procedure at the time of terminal devices being unreachable.

Figure 7:
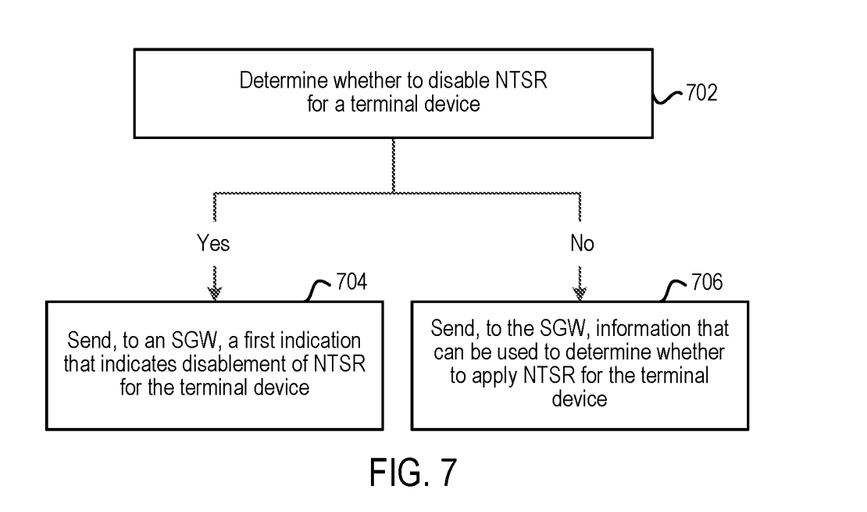
FIG. 7 is a flowchart illustrating a method implemented at an MME according to an embodiment of the disclosure.

FIG. 7 is a flowchart illustrating a method implemented at an MME according to an embodiment of the disclosure. At block 702, the MME determines whether to disable NTSR for a terminal device. As an example, this determination may be made based on an indication from an HSS, which will be described later with respect to blocks 801-802 of FIG. 8. As another example, this determination may be made based on local policy (e.g., NTSR is disabled for roaming users). As still another example, this determination may be made based on other information available in the MME (e.g., mobility information, PSM information, or the like), which will be described later with respect to block 902 of FIG. 9. If the MME determines to disable NTSR for the terminal device, the MME sends, at block 704, to an SGW, a first indication that indicates disablement of NTSR for the terminal device. The first indication belongs to the information that can explicitly indicate whether to apply NTSR for a terminal device as described above for the first option of block 202. On the other hand, if the MME determines not to disable NTSR for the terminal device, the MME sends, at block 706, to the SGW, information that can be used to determine whether to apply NTSR for the terminal device. This information belongs to the information that can implicitly indicate whether to apply NTSR for a terminal device as described above for the second option of block 202.

Figure 8:
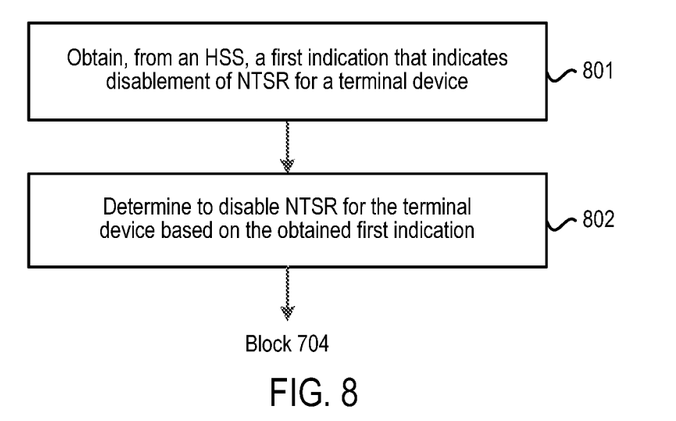
FIG. 8 is a flowchart illustrating a method implemented at an MME according to another embodiment of the disclosure.

FIG. 8 is a flowchart illustrating a method implemented at an MME according to another embodiment of the disclosure. As mentioned above, it can be used for explaining the method of FIG. 7. At block 801, the MME obtains, from an HSS, a first indication that indicates disablement of NTSR for the terminal device. The first indication may be generated by the HSS, which will be described in detail later. The first indication may be received in an Update Location Answer or Insert Subscriber Data Request message. At block 802, the MME determines to disable NTSR for the terminal device based on the obtained first indication. Since it is determined to disable NTSR, the MME sends the first indication to an SGW at block 704.

Figure 9:
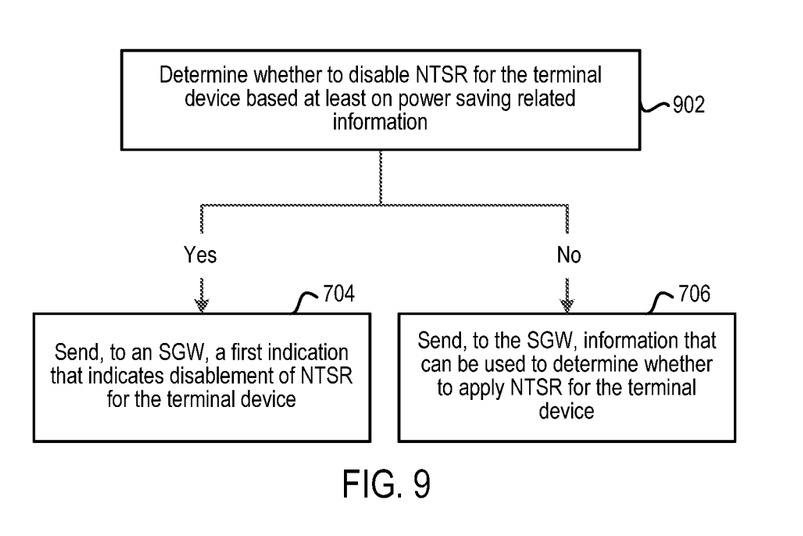
FIG. 9 is a flowchart illustrating a method implemented at an MME according to another embodiment of the disclosure.

FIG. 9 is a flowchart illustrating a method implemented at an MME according to another embodiment of the disclosure. As mentioned above, it can also be used for explaining the method of FIG. 7. At block 902, the MME determines whether to disable NTSR for the terminal device based at least on power saving related information that is related to power saving functionality of the terminal device. The power saving related information has been described above with respect to block 402-1. As an exemplary example, if PSM is enabled for the terminal device and the terminal device is of high mobility, the MME may determine to disable NTSR for the terminal device. This is in consideration of the fact that the enabled PSM means low possibility of successful paging for the terminal device and the high mobility means paging can be triggered by the terminal device itself. In this way, the network can be made more resource efficient for restoration procedure for terminal devices (e.g. CIoT users) using power saving feature when MME failure is detected.

Figure 10:
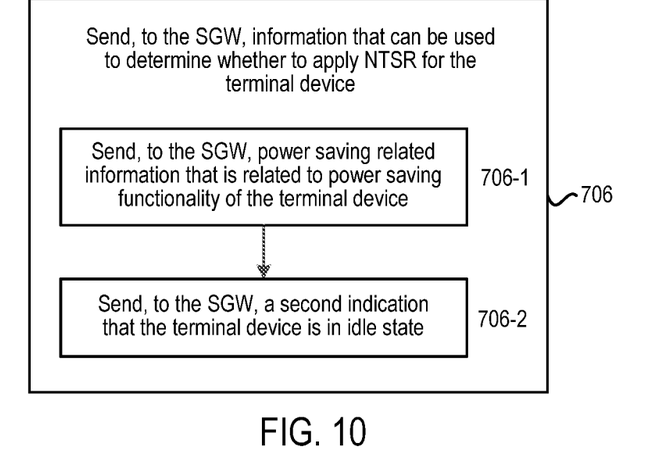
FIG. 10 is a flowchart for explaining the method of FIG. 9.

If the MME determines to disable NTSR for the terminal device, the MME sends, at block 704, to an SGW, a first indication that indicates disablement of NTSR for the terminal device. In this case, the first indication is generated by the MME. On the other hand, if the MME determines not to disable NTSR for the terminal device, the MME sends, at block 706, to the SGW, information that can be used to determine whether to apply NTSR for the terminal device. Block 706 may include blocks 706-1 and 706-2 shown in FIG. 10. At block 706-1, the MME sends, to the SGW, power saving related information that is related to power saving functionality of the terminal device. Block 706-1 corresponds to block 402-1 of FIG. 4 as described above. At block 706-2, the MME sends, to the SGW, a second indication that the terminal device is in idle state. Block 706-2 corresponds to block 402-2 of FIG. 4 as described above.

Figure 11:
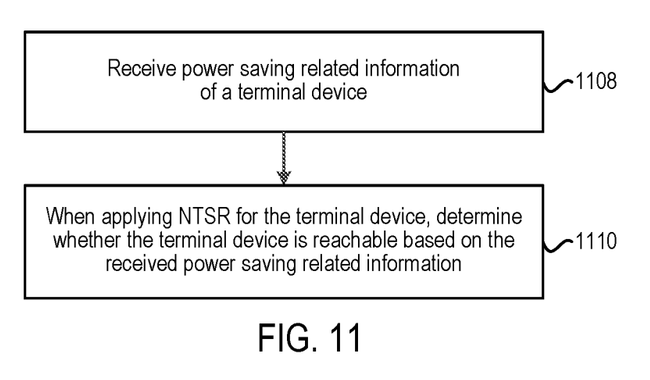
FIG. 11 is a flowchart illustrating a method implemented at an MME according to another embodiment of the disclosure.

FIG. 11 is a flowchart illustrating a method implemented at an MME according to another embodiment of the disclosure. At block 1108, the MME receives power saving related information of a terminal device. The power saving related information may include eDRX information, as described above with respect to block 606. As an example, the MME may be an MME that is restarted due to a failure and is selected for applying NTSR for the terminal device. In this case, block 1108 is performed in response to the restart of the MME. As another example, the MME may be an alternative MME that is selected for applying NTSR for the terminal device due to a failure of another MME. At block 1110, when applying NTSR for the terminal device, the MME determines whether the terminal device is reachable based on the received power saving related information. For example, if the current time is within PTW during each eDRX cycle, it may be determined that the terminal device is reachable, which means the paging can be performed. Otherwise, it may be determined that the terminal device is unreachable, which means the paging should not be performed. In this way, the waste of resource (e.g. radio resource) caused by NTSR procedure at the time of terminal devices being unreachable can be avoided.

Figure 12:
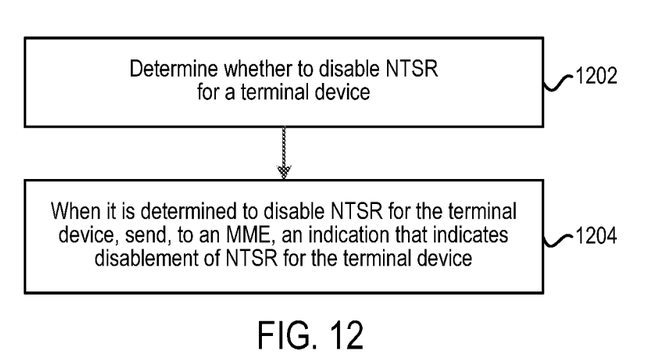
FIG. 12 is a flowchart illustrating a method implemented at an HSS according to an embodiment of the disclosure.

FIG. 12 is a flowchart illustrating a method implemented at an HSS according to an embodiment of the disclosure. At block 1202, the HSS determines whether to disable NTSR for a terminal device. This determination may be made based on the service type of the terminal device or a service level agreement (SLA) between the operator and a third party. For example, if a terminal device belongs to the device type which uses non-critical services, NTSR may be disabled for the terminal device. If the HSS determines to disable NTSR for the terminal device, the HSS sends, at block 1204, to an MME, an indication that indicates disablement of NTSR for the terminal device. Block 1204 corresponds to block 801 as described above.

Figure 13:
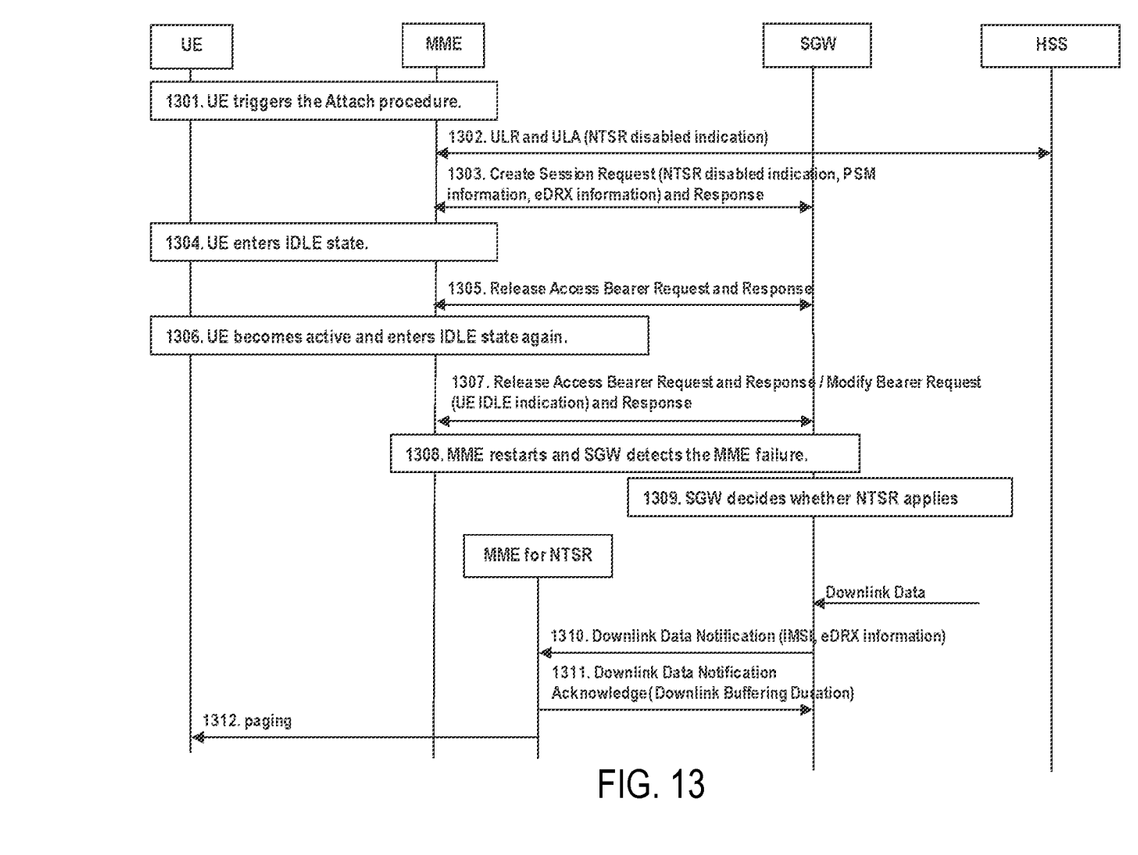
FIG. 13 is a flowchart illustrating an exemplary process according to an embodiment of the disclosure.

FIG. 13 is a flowchart illustrating an exemplary process according to an embodiment of the disclosure. In this exemplary process, the involved entities include a UE, an MME, an alternative MME for NTSR, an SGW and an HSS. The UE is a CIoT device. At block 1301, the UE triggers Attach procedure. At block 1302, the MME sends an update location request (ULR) to the HSS and the HSS replies with an update location answer (ULA). In the ULA, the HSS may include NTSR disabled indication, as described above for blocks 1202-1204. The indication may be sent on UE level or on access point name (APN) level. It is also possible that the NTSR disabled indication may be provided in an Insert Subscriber Data Request message. At block 1303, the MME sends a Create Session Request to the SGW and the SGW replies with a Create Session Response. As described above, the MME may decide that NTSR is disabled based on NTSR disabled indication received from the HSS, or based on local policy, or based on other information available in the MME (e.g., the UE is of high mobility and power saving feature is enabled for the UE). In this case, the MME may include NTSR disabled indication in the Create Session Request. On the other hand, if NTSR is not disabled and if the UE is using power saving feature, the MME may include PSM information and/or eDRX information in the Create Session Request.

At block 1304, the UE enters IDLE state. It is assumed that in majority cases of UE entering IDLE state, Release Access Bearer Request is applicable. Then, at block 1305, the MME sends a Release Access Bearer Request to the SGW and the SGW replies with a Release Access Bearer Response. At this point, for PSM enabled UE, the SGW may consider Active Time starts to take effect and the UE will enter sleeping state after Active Time expires. If there is new downlink data received, the SGW may still send a downlink data notification (DDN) to the MME even if the UE is in sleeping state unless the SGW has previously received Downlink Data Buffer Duration and it is has not expired. This is for the MME to setup the user plane for data transfer when the UE wakes up with non-access stratum (NAS) signalling.

At block 1306, the UE becomes active and then enters IDLE state again. Suppose Release Access Bearer Request is not applicable (e.g., the UE triggers TAU) this time. Then, at block 1307, the MME additionally sends a Modify Bearer Request to the SGW and the SGW replies with a Modify Bearer Response. In the Modify Bearer Request, the MME includes UE IDLE indication such that the SGW can know the start time at which the UE enters IDLE state. Note that each time the UE becomes active and then enters IDLE state again, if Release Access Bearer Request is not applicable, the MME additionally sends Modify Bearer Request to the SGW.

At block 1308, the MME restarts and the SGW detects the MME failure. At block 1309, the SGW decides whether NTSR applies. As described above, If NTSR is disabled, or if the UE is using PSM and the UE is in sleeping state, the SGW does not trigger NTSR. In this case, blocks 1310-1312 are skipped. Otherwise, the SGW may decide that NTSR applies. Optionally, as described above, the SGW may also decide the maximum time to keep the UE's session based on the UE's pTAU timer previously received from the MME.

At block 1310, If NTSR applies upon detection of the MME failure, and if there is buffered downlink data or there is new downlink data or signalling received, the SGW triggers the NTSR procedure. The SGW may send a DDN to the selected MME for NTSR. The selected MME may be the original one if it has recovered or another MME in the same MME pool. In the DDN message, the SGW additionally includes eDRX information if it has previously been received from the MME. Note that if the SGW has previously received Downlink Data Buffer Duration from the MME, the SGW waits for the expiry of the duration to trigger the NTSR procedure.

At block 1311, the MME decides whether the UE is reachable based on the received eDRX information and sends a DDN Acknowledge to the SGW. If the UE is not reachable, in the DDN Acknowledge, the MME includes Downlink Data Buffer Duration. On the other hand, if the UE is reachable, the MME pages the UE and the restoration procedure continues. It should be noted that two blocks shown in succession in the figures may, in fact, be executed substantially concurrently, or the blocks may sometimes be executed in the reverse order, depending upon the functionality involved.

Figure 14:
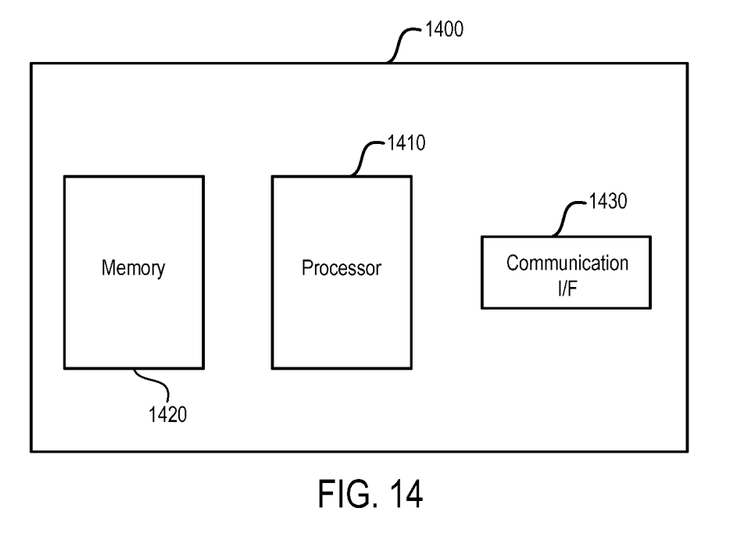
FIG. 14 is a block diagram showing an apparatus suitable for use in practicing some embodiments of the disclosure.

FIG. 14 is a block diagram showing an apparatus suitable for use in practicing some embodiments of the disclosure. For example, any one of the SGW, the MME and the HSS described above may be implemented through the apparatus 1400. As shown, the apparatus 1400 may include a processor 1410, a memory 1420 that stores a program, and a communication interface 1430 for communicating data with other external devices through wired and/or wireless communication.

The program includes program instructions that, when executed by the processor 1410, enable the apparatus 1400 to operate in accordance with the embodiments of the present disclosure, as discussed above. That is, the embodiments of the present disclosure may be implemented at least in part by computer software executable by the processor 1410, or by hardware, or by a combination of software and hardware.

The memory 1420 may be of any type suitable to the local technical environment and may be implemented using any suitable data storage technology, such as semiconductor based memory devices, flash memories, magnetic memory devices and systems, optical memory devices and systems, fixed memories and removable memories. The processor 1410 may be of any type suitable to the local technical environment, and may include one or more of general purpose computers, special purpose computers, microprocessors, digital signal processors (DSPs) and processors based on multi-core processor architectures, as non-limiting examples.

Figure 15:
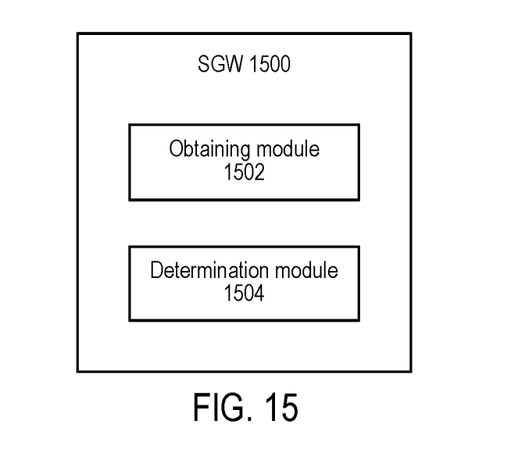
FIG. 15 is a block diagram showing an SGW according to an embodiment of the disclosure.

FIG. 15 is a block diagram showing an SGW according to an embodiment of the disclosure. As shown, the SGW 1500 comprises an obtaining module 1502 and a determination module 1504. The obtaining module 1502 may be configured to obtain, from an MME, information capable of indicating whether to apply NTSR for a terminal device, as described above with respect to block 202. The determination module 1504 may be configured to, in response to detecting a failure of the MME, determine whether to apply NTSR for the terminal device based on the obtained information, as described above with respect to block 204.

Figure 16:
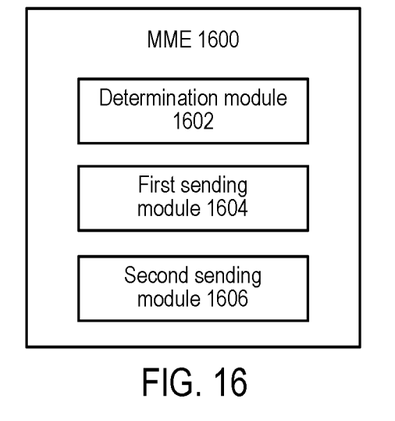
FIG. 16 is a block diagram showing an MME according to an embodiment of the disclosure.

FIG. 16 is a block diagram showing an MME according to an embodiment of the disclosure. As shown, the MME 1600 comprises a determination module 1602, a first sending module 1604 and a second sending module 1606. The determination module 1602 may be configured to determine whether to disable NTSR for a terminal device, as described above with respect to block 702. The first sending module 1604 may be configured to, when it is determined to disable NTSR for the terminal device, sending, to an SGW, a first indication that indicates disablement of NTSR for the terminal device, as described above with respect to block 704. The second sending module 1606 may be configured to, when it is determined not to disable NTSR for the terminal device, send, to the SGW, information that can be used to determine whether to apply NTSR for the terminal device, as described above with respect to block 706.

Figure 17:
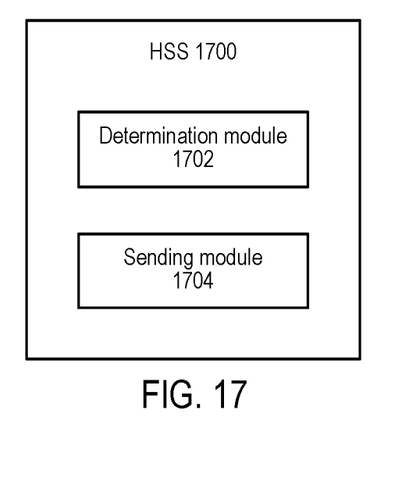
FIG. 17 is a block diagram showing an HSS according to an embodiment of the disclosure.

FIG. 17 is a block diagram showing an HSS according to an embodiment of the disclosure. As shown, the HSS 1700 comprises a determination module 1702 and a sending module 1704. The determination module 1702 may be configured to determine whether to disable NTSR for a terminal device, as described above with respect to block

1202. The sending module may be configured to, when it is determined to disable NTSR for the terminal device, send, to an MME, an indication that indicates disablement of NTSR for the terminal device, as described above with respect to block 1204. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a serving gateway, SGW, the method comprising:
   obtaining, from a mobility management entity, MME, information capable of indicating whether to apply network triggered service restoration, NTSR, for a terminal device, obtaining the information from the MME comprising:
      receiving, from the MME, power saving related information that is related to power saving functionality of the terminal device; and
      receiving, from the MME, a second indication that the terminal device is in idle state; and
   in response to detecting a failure of the MME, determining whether to apply NTSR for the terminal device based on the obtained information, determining whether to apply NTSR for the terminal device comprising determining whether to apply NTSR for the terminal device based on the power saving related information and the second indication.

2. The method according to claim 1, wherein obtaining the information from the MME comprises:
   receiving, from the MME, a first indication that indicates disablement of NT SR for the terminal device; and
   wherein determining whether to apply NTSR for the terminal device comprises: determining not to apply NTSR for the terminal device based on the first indication wherein the first indication is received in a Create Session Request message.

3. The method according to claim 1, further comprising:
   determining a maximum time period for keeping a session of the terminal device before restoration of the session, based on the power saving related information.

4. The method according to claim 1, wherein determining whether to apply NTSR for the terminal device comprises:

determining whether the terminal device is in sleeping state based on the second indication and the power saving related information; and if the terminal device is in sleeping state, determining not to apply NTSR for the terminal device.

5. The method according to claim 1, further comprising: when it is determined to apply NTSR for the terminal device, sending the power saving related information to the MME that has been restarted or an alternative MME.

6. The method according to claim 5, wherein the power saving related information is sent to the restarted MME or the alternative MME in a downlink data notification, DDN, message and wherein the power saving related information sent to the restarted MME or the alternative MME comprises eDRX information.

7. The method according to claim 1, wherein the power saving related information comprises at least one of power saving mode, PSM, information and extended discontinuous reception, eDRX, information;

wherein the power saving related information is received in a Create Session Request message; and wherein the second indication is received in a Release Access Bearer Request message or a Modify Bearer Request message.

8. The method according to claim 7, wherein the PSM information comprises: active time; and periodic tracking area update, pTAU, timer; and wherein the eDRX information comprises: global unique temporary identity, GUTI of the terminal device; paging time window, PTW; and eDRX cycle.

9. A method implemented at a mobility management entity, MME, the method comprising:

determining whether to disable network triggered service restoration, NTSR, for a terminal device;

when it is determined to disable NTSR for the terminal device, sending, to a serving gateway, SGW, a first indication that indicates disablement of NTSR for the terminal device, determining whether to disable NTSR for the terminal device comprising determining whether to disable NTSR for the terminal device based at least on power saving related information that is related to power saving functionality of the terminal device; and when it is determined not to disable NTSR for the terminal device, sending, to the SGW, information that can be used to determine whether to apply NTSR for the terminal device.

10. The method according to claim 9, further comprising: obtaining the first indication from a home subscriber server, HSS; and wherein determining whether to disable NTSR for the terminal device comprises: determining to disable NTSR for the terminal device based on the obtained first indication.

11. The method according to claim 9, wherein determining whether to disable NTSR for the terminal device based at least on the power saving related information comprises:

when the terminal device is of high mobility and the power saving related information indicates that power saving mode, PSM, is enabled for the terminal device, determining to disable NTSR for the terminal device.

12. The method according to claim 9, wherein sending the information to the SGW comprises:

sending, to the SGW, power saving related information that is related to power saving functionality of the terminal device; and sending, to the SGW, a second indication that the terminal device is in idle state.

13. The method according to claim 9, further comprising: receiving power saving related information of a terminal device; and when applying NTSR for the terminal device, determining whether the terminal device is reachable based on the received power saving related information.

14. The method according to claim 13, wherein the received power saving related information comprises extended discontinuous reception, eDRX, information.

15. A method implemented at a home subscriber server, HSS, the method comprising:

determining whether to disable network triggered service restoration, NTSR, for a terminal device; and when it is determined to disable NTSR for the terminal device, sending, to a mobility management entity, MME, an indication that indicates disablement of NTSR for the terminal device.

16. The method according to claim 15, wherein the indication is sent in an Update Location Answer or Insert Subscriber Data Request message.

17. A serving gateway, SGW, comprising:

at least one processor, and at least one memory, the at least one memory containing instructions executable by the at least one processor, whereby the SGW is operative to:

obtain, from a mobility management entity, MME, information capable of indicating whether to apply network triggered service restoration, NTSR, for a terminal device, obtaining the information from the MME comprising:

receiving, from the MME, power saving related information that is related to power saving functionality of the terminal device; and receiving, from the MME, a second indication that the terminal device is in idle state; and in response to detecting a failure of the MME, determine whether to apply NTSR for the terminal device based on the obtained information, determining whether to apply NTSR for the terminal device comprising determining whether to apply NTSR for the terminal device based on the power saving related information and the second indication.

18. The SGW according to claim 17, wherein the SGW is operative to:

obtain from a mobility management entity, MME, information capable of indicating whether to apply network triggered service restoration, NTSR, for a terminal device, obtaining the information from the MME comprising receiving, from the MME, a first indication that indicates disablement of NTSR for the terminal device; and determining whether to apply NTSR for the terminal device comprising determining not to apply NTSR for the terminal device based on the first indication, wherein the first indication is received in a Create Session Request message.

* * * * *